US009717052B2

(12) United States Patent
Chung et al.

(10) Patent No.: US 9,717,052 B2
(45) Date of Patent: Jul. 25, 2017

(54) METHOD FOR RECEIVING RADIO PACKET THROUGH SHORT-RANGE WIRELESS COMMUNICATION, PORTABLE TERMINAL, AND SHORT-RANGE WIRELESS COMMUNICATION SYSTEM

(71) Applicant: A2UICT CO., LTD., Seongnam-si, Gyeonggi-do (KR)

(72) Inventors: Sung Hyun Chung, Seongnam-si (KR); Min Joong Rim, Seoul (KR)

(73) Assignee: A2UICT CO., LTD., Seongnam-si, Gyeonggi-Do (KR)

(*) Notice: Subject to any disclaimer, the term of this patent is extended or adjusted under 35 U.S.C. 154(b) by 78 days.

(21) Appl. No.: 14/758,954

(22) PCT Filed: Nov. 29, 2013

(86) PCT No.: PCT/KR2013/010948
§ 371 (c)(1),
(2) Date: Jul. 1, 2015

(87) PCT Pub. No.: WO2014/112715
PCT Pub. Date: Jul. 24, 2014

(65) Prior Publication Data
US 2015/0341861 A1    Nov. 26, 2015

(30) Foreign Application Priority Data
Jan. 16, 2013 (KR) .......................... 10-2013-0004949

(51) Int. Cl.
*H04W 52/02* (2009.01)
*H04W 4/00* (2009.01)
(Continued)

(52) U.S. Cl.
CPC ....... *H04W 52/0229* (2013.01); *H04W 4/008* (2013.01); *H04W 84/12* (2013.01); *H04W 88/02* (2013.01); *Y02B 60/50* (2013.01)

(58) Field of Classification Search
CPC ........................ H04L 27/2602; H04L 25/0204
(Continued)

(56) References Cited

U.S. PATENT DOCUMENTS 6,195,573 B1   2/2001   Cassidy et al.
8,798,029 B2 *  8/2014   Soliman ................ H04W 48/14
                                                                    370/350
(Continued)

FOREIGN PATENT DOCUMENTS

EP          0780989 A2    6/1997
KR   10-2004-0045413 A    6/2004
(Continued)

OTHER PUBLICATIONS

International Search Report for PCT/KR2013/010948 mailed Mar. 12, 2014 from Korean Intellectual Property Office.

*Primary Examiner* — Charles C Jiang
*Assistant Examiner* — Will Lin
(74) *Attorney, Agent, or Firm* — Revolution IP, PLLC

(57) ABSTRACT

A method for receiving radio packets through short-range wireless communication includes receiving a first radio signal through the short-range wireless communication, identifying a preamble used for synchronization of the short-range wireless communication from a analog signal of the received first radio signal, determining whether the frequency from the identified preamble is within a specified frequency offset range, and processing data from the received first radio signal if the frequency from the identified preamble is within the specified frequency offset range.

6 Claims, 6 Drawing Sheets

(51) Int. Cl.
*H04J 3/06* (2006.01)
*H04W 88/02* (2009.01)
*H04W 84/12* (2009.01)

(58) Field of Classification Search
USPC .................................................. 370/350, 522
See application file for complete search history.

(56) References Cited

U.S. PATENT DOCUMENTS

| 8,798,210 | B2* | 8/2014 | Zhang | ................. | H04L 27/2675 |
| | | | | | 375/142 |
| 2003/0176195 | A1 | 9/2003 | Dick et al. | | |
| 2009/0221283 | A1* | 9/2009 | Soliman | ................ | H04W 48/14 |
| | | | | | 455/426.1 |
| 2010/0008436 | A1* | 1/2010 | Zhang | ................... | H04L 1/0079 |
| | | | | | 375/260 |
| 2011/0319073 | A1* | 12/2011 | Ekici | .................... | H04W 48/18 |
| | | | | | 455/426.1 |
| 2013/0044678 | A1* | 2/2013 | Qu | ...................... | H04W 52/244 |
| | | | | | 370/328 |
| 2013/0309971 | A1* | 11/2013 | Kiukkonen | ........... | H04L 63/107 |
| | | | | | 455/41.2 |

FOREIGN PATENT DOCUMENTS

| KR | 10-2007-0031246 A | 3/2007 |
| KR | 10-2011-0024094 A | 3/2011 |

* cited by examiner

METHOD FOR RECEIVING RADIO PACKET THROUGH SHORT-RANGE WIRELESS COMMUNICATION, PORTABLE TERMINAL, AND SHORT-RANGE WIRELESS COMMUNICATION SYSTEM

CROSS REFERENCE TO PRIOR APPLICATIONS

This application is a National Stage Application of PCT International Patent Application No. PCT/KR2013/010948 filed on Nov. 29, 2013, under 35 U.S.C. §371, which claims priority to Korean Patent Application No. 10-2013-0004949 filed on Jan. 16, 2013, which are all hereby incorporated by reference in their entirety.

TECHNICAL FIELD

The present invention relates to a method for receiving radio packets through short-range wireless communication, a portable terminal and a short-range wireless communication system, and more particularly to a method, a portable terminal, and a short-range wireless communication system for receiving radio packets through short-range wireless communication to reduce consumed power of the portable terminal by using a signature identified in a physical layer of short-range wireless communication.

BACKGROUND ART

As communication technology advances, evolution of 3G mobile communication systems is about to reach their fourth generation (4G). Such a 4G mobile communication system enables portable terminals capable of using mobile communication systems to be based on IP (Internet Protocol) in communication, and implement fast upload and download speeds.

Evolution for reaching the 4G mobile communication system contributes to sending/receiving user data even faster. On the contrary, portable terminals are expected to consume more power to cause the available time of portable terminals to be reduced.

Accordingly, there is a need for developing a method for improving battery life on portable terminals in line with emerging 4G mobile communication systems.

The exemplary Green-T(echnology) of EUREKA project has studied the technology for minimizing power consumed by the 4G portable terminals by adopting the heterogeneous radio access technology in order to overcome the aforementioned energy trap thereof.

In particular, the Green-T project aims to develop a method for implementing data communication by using a neighboring short-range wireless communication system if much transmission power is required for sending/receiving data to/from a base station because terminals are far away from the base station.

For example, FIG. 1 shows an exemplary system block using a wireless LAN or wireless PAN (Personal Area Network) for a portable terminal with battery limitation in short-range wireless communication with another portable terminal while the other portable terminal uses 4G mobile communication for relay to a base station.

The aforementioned another portable terminal may be a portable terminal free from power consumption compared with the portable terminal in the battery limitation.

FIG. 2 shows a system block for sending/receiving data to/from a portable terminal by using a short-range wireless communication system, for example, a wireless LAN or high-speed wireless PAN, not 4G mobile communications.

The aforementioned FIGS. 1 and 2 illustrate reducing power consumption by utilizing a neighboring portable terminal or neighboring short-range wireless communication system while adopting short-range wireless communication, not direct wireless communication through a base station.

Portable terminals of which the battery levels drop below a certain level and which do not consume enough power or have battery limitation utilize short-range wireless communication systems, for example, a wireless LAN or wireless PAN in place of using a base station in order to reduce power consumption, as shown in FIGS. 1 and 2. In this case, however, unnecessarily more power than required is consumed, and even more power may be required than using a base station.

For example, radio data packets used in a short-range wireless communication system are sent/received through a specified carrier frequency. A portable terminal receiving them determines whether the destination of the received radio data packets is the portable terminal itself at the link layer (for example, at the MAC (Media Access Control) layer) which is one of the seven layers of the OSI (Open Systems Interconnection) model and then carries out subsequent processing.

This process involves various processes. For example, the physical layer receives radio signals and demodulates the received radio signals, and the MAC layer then determines the MAC data packets to determine a destination address by using the packets.

A portable terminal having a limited battery or power level may know a destination address only through this process, which consumes even more power. Furthermore, this is even worsened in the case that a plurality of terminals are connected in a short-range wireless communication system the portable terminal wants to access.

Therefore, there is a need for a method for receiving radio packets through short-range wireless communication, a portable terminal and a short-range wireless communication system by filtering out a plurality of unnecessarily radio data packets to reduce power consumption even though the portable terminal uses a short-range wireless communication system as an alternative to a mobile communication system in which the portable terminal uses a base station.

Meanwhile, a portable terminal may not use a 4G mobile communication system. For example, the portable terminal may use a 3G mobile communication system or other mobile communication system, and further access the Internet through short-range wireless communication. There is also a need for a method for receiving radio packets through short-range wireless communication, a portable terminal and a short-range wireless communication system to reduce power consumed to access a short-range wireless communication system by the portable terminal.

DISCLOSURE

Technical Problem

In view of the above, the present invention to address the aforementioned problems provides a method for receiving radio packets through short-range wireless communication, a portable terminal, and a short-range wireless communication system, which reduce power consumption in communication with a base station by switching from a mobile communication system to a short-range wireless communication system.

Further, the present invention provides a method for receiving radio packets through short-range wireless communication, a portable terminal, and a short-range wireless communication system, which significantly reduce power consumption in a portable terminal consumed through the short-range wireless communication system.

Further, the present invention provides a method for receiving radio data packets through short-range wireless communication, a portable terminal, and a short-range wireless communication system, which filter out the radio data packets transmitted/received in a physical layer in a short-range wireless communication system.

Further, the present invention provides a method for receiving radio data packets through short-range wireless communication, a portable terminal, and a short-range wireless communication system, which easily identify a device for transmitting the radio data packets in a physical layer while using a conventional physical layer format of the short-range wireless communication system.

The technical scope of the present invention is not limited to the aforementioned technical scope, and other technical scopes not mentioned above will be apparent to those skilled in the art from the following description.

Technical Solution

In accordance with an embodiment of the present invention, there is provided a method for receiving radio packets through short-range wireless communication. The method includes: (a) receiving a first radio signal through the short-range wireless communication; (b) identifying a preamble used for synchronization of the short-range wireless communication from a analog signal of the received first radio signal; (c) determining whether the frequency from the identified preamble is within a specified frequency offset range; and (d) processing data from the received first radio signal if the frequency from the identified preamble is within the specified frequency offset range.

In the embodiment, the method further includes, before said (a) receiving a first radio signal: receiving a second radio signal using a communication protocol different from the short-range wireless communication; determining a second carrier frequency from the second radio signal; and determining a first carrier frequency of the short-range wireless communication using the determined second carrier frequency. In the embodiment, said (c) determining includes determining whether the frequency from the identified preamble is within the specified frequency offset range using the first carrier frequency.

In the embodiment, said (b) identifying a preamble is carried out in a physical layer of 7 layers of the OSI (Open Systems Interconnection) model.

In accordance with another embodiment of the present invention, there is provided a portable terminal which includes: a first radio signal sending/receiving unit configured to send/receive first radio signal through short-range wireless communication; a second radio signal receiving unit configured to receive a second radio signal using a communication protocol different from the short-range wireless communication; a signature determination unit configured to determine a first carrier frequency used in the first radio signal sending/receiving unit using a second carrier frequency determined from the second radio signal, identify a signature from a analog signal of the received first radio signal using the determined first carrier frequency, and determine whether the identified signature is a specified signature; and a control unit configured to process the data from the received first radio signal if the identified signature is a specified signature.

In the embodiment, the signature determination unit identifies a preamble from the analog signal of the received first radio signal using the first carrier frequency, and determines whether the signature identified is a specified signature by determining whether the frequency from the identified preamble is within a specified frequency offset range.

In accordance with another embodiment of the present invention, there is provided a short-range wireless communication system. The system includes: a connecting device capable of being connected to a wire or wireless second network and capable of being connected with one or more portable terminals through a first network which is a short-range wireless communication network different from the second network. In the embodiment, the connecting device establish a signature using a frequency offset for a first carrier frequency of the first network, the signature being different for each of the one or more portable terminals for radio data communication through the first network with the one or more portable terminals and being used for determining whether to process radio signal data in each portable terminal and the signature is identified in a physical layer of 7 layers of the OSI (Open Systems Interconnection) model.

In the embodiment, the connecting device is configured to determine the signature in establishing a connection with the one or more portable terminals.

In the embodiment, the system further includes the one or more portable terminals connected with short-range wireless communication. In the embodiment, the connecting device is configured to identify frequency offsets for a first carrier frequency in the radio signal data transmitted/received through the first network and establish the signature for each portable terminal based on the identified frequency offsets.

Advantageous Effects

As described above, the method for receiving radio packets through short-range wireless communication, the portable terminal and the short-range wireless communication system in accordance with the present invention reduce power consumption in communication with a base station by switching from a mobile communication system to a short-range wireless communication.

Further, the method for receiving radio packets through short-range wireless communication, the portable terminal and the short-range wireless communication system in accordance with the present invention significantly reduce power consumption in the portable terminal consumed through the short-range wireless communication system.

Further, the method for receiving radio packets through short-range wireless communication, the portable terminal and the short-range wireless communication system in accordance with the present invention filter out radio data packets sent/received to/from the short-range wireless communication system in a physical layer.

In addition, the method for receiving radio packets through short-range wireless communication, the portable terminal and the short-range wireless communication system in accordance with the present invention easily identify a device sending radio data packets in a physical layer while using the format of a conventional physical layer of a short-range wireless communication system.

The effects of the present invention are not limited to the aforementioned effects, and other effects will be apparent to those skilled in the art of the present disclosure from the following description.

DESCRIPTION OF NUMERALS

Figure 1:
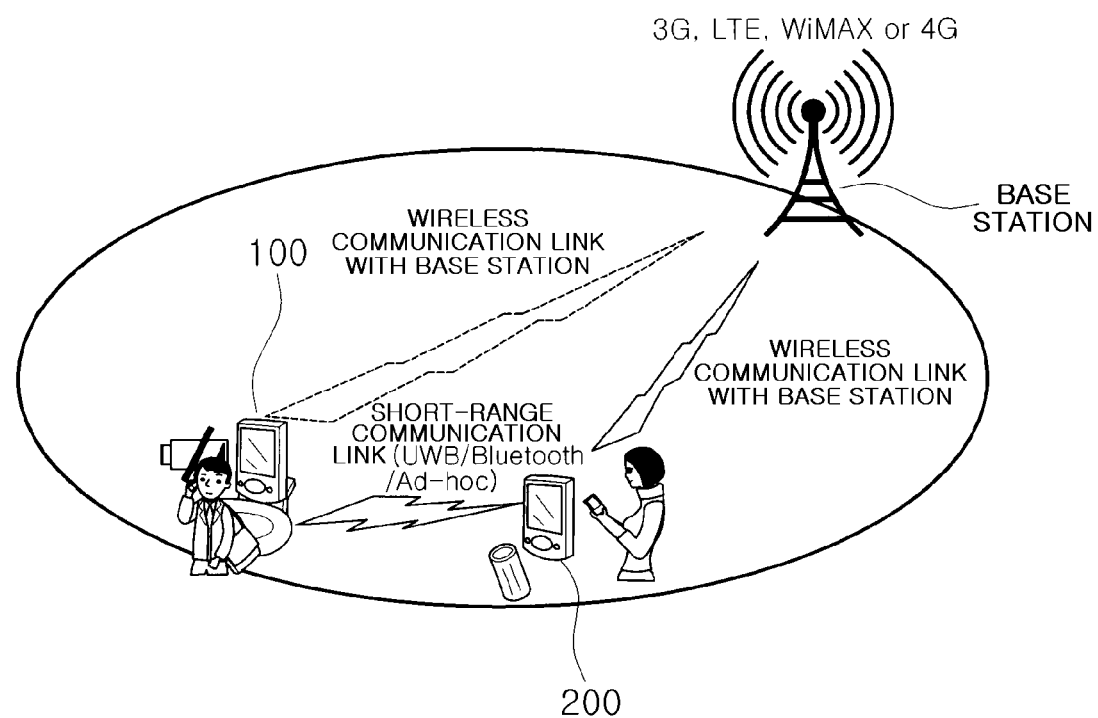
FIG. 1 shows a block diagram of an exemplary system for reducing power consumption in a portable terminal by using a short-range wireless communication system.
Figure 2:
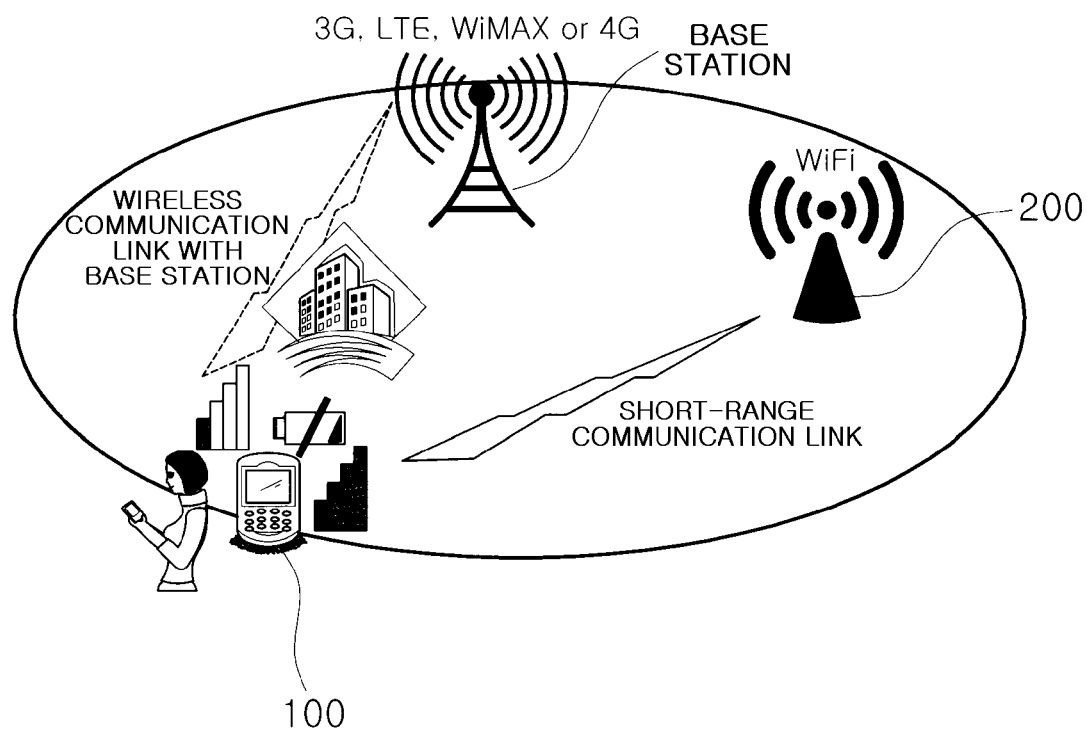
FIG. 2 shows a block diagram of another exemplary system for reducing power consumption in a portable terminal by using a short-range wireless communication system.

100: portable terminal
110: first radio signal sending/receiving unit
120: second radio signal receiving unit
130: signature determination unit
131: first carrier frequency generator
133: frequency comparator
140: baseband signal processor
150: memory unit 160: input unit
170: output unit 180: control unit
190: battery unit
200: connecting device
210: first network interface
220: second network interface
230: carrier frequency detector
240: signature detector
250: signature creator
251: first carrier frequency generator
260: baseband signal processor
270: memory unit 280: control unit
290: third network interface
300: first network 400: second network

BEST MODE

The aforementioned scope, characteristics and advantages of the present invention will be more apparent from the following description provided in detail with reference to the accompanying drawings, to help those skilled in the art understand the technical scope of the present invention. In addition, if a specific description of technology well known in the art in relation to the present invention is considered to make the point of the present invention unnecessarily unclear while describing the present invention, the specific description is not provided. The embodiments in accordance with the present invention will be described in detail hereinafter with reference to the accompanying drawings.

Figure 3:
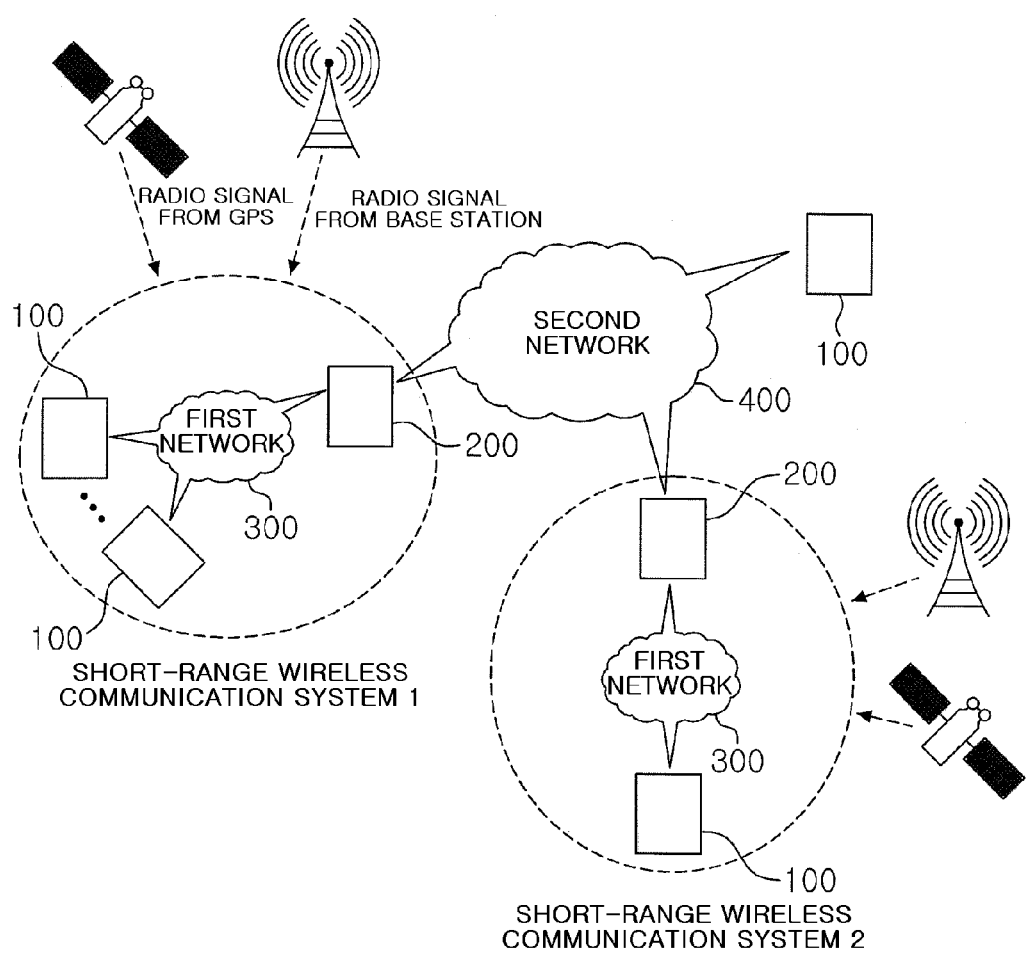
FIG. 3 shows a block diagram of an exemplary broadband system in accordance with the present invention.

Referring to FIG. 3, a block diagram of an exemplary system is illustrated in accordance with the present invention. A broadband system includes one or more short-range wireless communication systems, a second network 400 for communication by wire or wireless between the short-range wireless communication systems, and one or more portable terminals 100 connected with the second network 400.

The short-range wireless communication system includes one or more portable terminals 100, a connecting device 200 to make a one-to-one or N (N is 2 or greater)-to-one connection with the one or more portable terminals 100 to be connected with the second network 400, and a first network 300 through which the connecting device 200 and the portable terminals 100 is connected to allow radio data to be sent/received between them.

Further, the broadband system includes a base station for sending/receiving radio signals in a CDMA and/or GSM-based mobile communication system, and a GPS satellite for sending GPS (Global Positioning System) radio signals for determining positions or time.

The base station may be included in the second network depending on its application.

Exemplary embodiments are described herein below by using the broadband system.

The broadband system includes one or more short-range wireless communication systems and a second network 400 capable of sending/receiving data by wire or wireless between the short-range wireless communication systems.

Each short-range wireless communication system includes a first network 300 capable of sending/receiving radio data, for example, between tens of centimeters and tens of meters. The first network 300 enables data to be sent/received between the one or more portable terminals 100 and the connecting device 200 by wireless.

The aforementioned first network 300 is a short-range wireless communication network, for example, a wireless LAN, UWB (Ultra wideband), Bluetooth or ZigBee, for sending/receiving data by wireless between devices in a short range in a specified format in a specified frequency band.

The first network 300 is a network capable of making a one-to-one, one-to N (N is 2 or greater), or N-to-N connection between devices.

The portable terminal 100 is a terminal carried by its user, and may be, for example, mobile phones, smartphones, tablet PCs, PDAs (Personal Digital Assistants) or laptop PCs.

The portable terminal 100 may use a short-range wireless communication interface equipped therein for making a connection with the short-range wireless communication system, and may carry out call or data communication with a remote portable terminal 100 through the first network 300 and/or the second network 400, or access web servers (not shown) connected with the second network 400 to surf the Internet.

In addition, the portable terminal 100 may receive radio signals in a data format specified for a specified frequency band from a base station for the mobile communication system and/or GPS satellites. The portable terminal 100 may be synchronized with the carrier frequency included in the radio signals from the base station and/or GPS satellites. Therefore, the portable terminal 100 may be in communication with the base station and/or can determine location in accordance with the signal from the GPS satellites.

The portable terminal 100 capable of being in communication with a base station may be in communication with other portable terminals 100 or other web servers by using a short-range wireless communication system, not a base station, under the control of a base station or a remote control server (not shown) connected with the base station.

For example, the aforementioned communication may be carried out if the battery equipped in the portable terminal 100 is below a threshold.

In addition, the portable terminal 100 may use a short-range wireless communication system to access other portable terminals 100 in a short-range wireless communication system, other portable terminals 100 or servers connected with the second network 400 to send/receive data. This is carried out without the control of a remote control server.

In case where a portable terminal 100 uses a short-range wireless communication system to send/receive radio data as described above, it is necessary to monitor whether the destination address of all radio data packets at a specified frequency (for example, 2.4 GHz or 900 MHz) used in the short-range wireless communication system is the portable terminal 100. This process makes the portable terminal 100 unnecessarily consume more power.

For example, for a wireless LAN, it is not possible to decide whether the destination address of the data packets of each radio signal in the physical layer of 7 layers of the OSI (Open Systems Interconnection) model is the portable terminal 100. It is thus essential to use at least the MAC address in the MAC (Media Access Control) layer for the decision. As a result, unnecessary radio signal processing is involved to increase consumed power.

The description for the portable terminal 100 will be made in more detail with reference to FIGS. 4 and 6.

The connecting device 200 connected with the portable terminal 100 through the first network 300 to send/receive radio data packets thereto/therefrom is a portable or non-portable device.

The connecting device 200 may be, for example, wireless APs (Access Points), portable phones, smartphones, tablet PCs, or network converters used for making a connection between any networks. The connecting device 200 may be, for example, a device having enough battery power or a device to which power continues to be supplied externally.

The connecting device 200 is connected with the second network 400 by wire or wireless according to a communication protocol specified for the second network 400. In addition, the connecting device 200 is connected with the first network 300 forming a short-range wireless communication network different from the second network 400 to send/receive data to/from the portable terminal 100 by wireless.

The aforementioned data may be audio data or video data sent/received through CDMA, GSM or a mobile communication system (3G or 4G) based on CDMA or GSM. The data may otherwise be data for accessing a remote server (for example, web server) by using the Internet independent of the mobile communication system.

The connecting device 200 may be connected with one or more portable terminals 100 and determine or establish a signature used in each portable terminal 100. It is not essential to determine the signature at the connecting device 200, and it may be determined by a portable terminal 100 in establishing a connection with a short-range wireless communication network.

The signature established for each portable terminal 100 may be different for each portable terminal 100. Therefore, this allows each portable terminal 100 to determine whether to process the received radio signal.

Preferably the aforementioned signature is allowed to be identified in, for example, the physical layer of 7 layers of the OSI model, and may be configured by using a frequency offset for a first carrier frequency used in the first network 300.

For example, when the connecting device 200 or the portable terminal 100 is connected with the first network 300, the frequency offset may be determined. The connecting device 200 or the portable terminal 100 identifies or monitors the frequency offset used in the current first network 300, or uses the information about the frequency offset already established or allocated, and then establish a frequency offset based on these. The established signature (in this case, frequency offset) may be sent in establishing a connection to a corresponding portable terminal 100 or connecting device 200.

Further, the connecting device 200 may receive radio signals from a base station for a mobile communication system and/or GPS satellites in a data format specified for a specified frequency band. The connecting device 200 may be synchronized with the carrier frequency included in the radio signals from the base station and/or GPS satellites or be in communication with the base station.

The connecting device 200 described above may be configured differently depending on its application. For example, if the connecting device 200 is a wireless AP or laptop computer, one thing needed is that it is configured to be synchronized with the carrier frequency from a base station or GPS satellites, or determine the carrier frequency.

The description for connecting device 200 will be made in more detail with reference to FIG. 5.

The second network 400 is a network for making a connection of the connecting devices 200 or the portable terminals 100 in the first network 300.

The second network 400 is, for example, a mobile communication network based on CDMA or GSM (for example, if the connecting device 200 uses a mobile communication system). Or, the second network 400 may be a network built with, for example, a wired network and a wireless network (so-called the Internet, for example, if the connecting device 200 is a wireless AP) different from a mobile communication network.

The portable terminal 100 may be in communication with other portable terminals 100 and other remote servers by using the second network 400.

Figure 4:
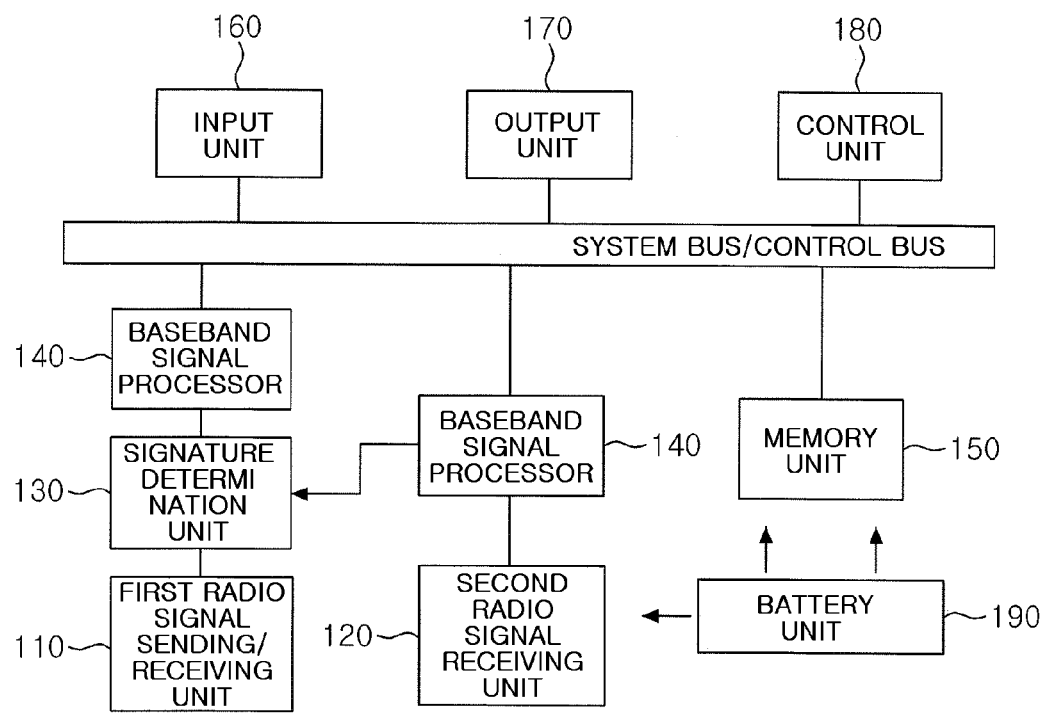
FIG. 4 shows a block diagram of an exemplary portable terminal.

FIG. 4 shows a block diagram of an exemplary portable terminal 100.

Referring to FIG. 4, the portable terminal 100 includes a first radio signal sending/receiving unit 110, a second radio signal receiving unit 120, a signature determination unit 130, a baseband signal processor 140, a memory unit 150, an input unit 160, an output unit 170, a control unit 180, a battery unit 190, and a system bus/control bus (its number not shown).

Some of the components may be omitted if required, and components not shown in FIG. 4 may be included in the exemplary block diagram of FIG. 4.

Describing each component of the portable terminal 100, the input unit 160 is an interface for receiving inputs by a user who uses the portable terminal 100. The input unit 160 includes, for example, touch buttons, a touch panel, and a microphone to receive user's inputs.

The user may request the control unit 180 to be connected with the first network 300 through the input unit 160.

The output unit 170 includes a display, for example, a LED (Light-Emitting Diode), a loudspeaker and a headphone jack to output video, images or audio for the user under the control of the control unit 180.

The battery unit 190 includes a rechargeable battery of lithium-ion or lithium-polymer type to supply power required by the components of the portable terminal 100. The battery unit 190 may provide current charging status of the rechargeable battery to the control unit 180, and the control unit 180 may then take required actions in response thereto.

The memory unit 150 includes a volatile memory and/or a nonvolatile memory. The memory unit 160 is for storing application programs used in the portable terminal 100, or storing temporary data required by the application programs.

The first radio signal sending/receiving unit 110 receives and sends a first radio signal through the first network 300 which is short-range wireless communication. The first radio signal sending/receiving unit 110 includes an antenna compliant with to the specific communication protocol type of the first network 300.

The first network 300 may be a wireless network enabling short-range communication, for example, Bluetooth, Zig-Bee, a wireless LAN, or UWB. The first network 300 has an antenna for sending/receiving radio signals at a frequency adapted to each network type.

The second radio signal receiving unit 120 includes an antenna for receiving second radio signal using communication protocols different from those for the first network 300 which is short-range wireless communication. The second radio signal may be, for example, a radio signal from a base station which is part of a mobile communication system or a GPS radio signal from GPS satellites.

The second radio signal receiving unit 120 receives the second radio signal. The second radio signal receiving unit 120 may also send radio signals (for example, if it is served by a mobile communication system) through an antenna if required.

In here, the antenna included in the first radio signal sending/receiving unit 110 and the antenna included in the second radio signal receiving unit 120 may be the same antenna depending on their configuration.

The signature determination unit 130 identifies a signature used to identify whether the analog signal of the first radio signal received from the first radio signal sending/receiving unit 110 is destined to or is directed to the portable terminal 100. And then, the signature determination unit 130 also determines whether the identified signature is a specified signature.

To this end, the signature determination unit 130 determines the (first) carrier frequency used for sending or receiving radio signals in the first radio signal sending/receiving unit 110 by using a (second) carrier frequency determined or created from the baseband signal processor 140 connected with the second radio signal receiving unit 120. Further, the signature determination unit 130 identifies a signature and determines whether the identified signature is a specified signature on a basis of the determined first carrier frequency.

For example, the signature determination unit 130 may identify the preamble of the physical layer compliant with the short-range communication protocol specified at the analog signal received from the first radio signal sending/receiving unit 110, and determine frequency offsets in the carrier frequency of the specified short-range communication protocol to decide whether the frequency offsets are within the specified frequency offset range or are the same as the specified frequency offset in order to determine whether the signature is a specified signature.

In this case, the information about the established frequency offset may be received from the connecting device 200 in establishing a connection of the short-range wireless communication network, and may be stored in the memory unit 150.

As described above, the signature determination unit 130 may identify a signature in the physical layer prior to the communication layer in a digital domain, to alleviate the burden of subsequent processing on the control unit 180. By virtue of the foregoing, power consumption may be reduced while using a short-range wireless communication system.

To this end, the signature determination unit 130 may include a first carrier frequency generator 131 (not shown specifically) and a frequency comparator 133 (not shown specifically).

To be more specific, the first carrier frequency generator 131 creates a specified carrier frequency according to the communication type of the short-range wireless communication system from the second carrier frequency synchronized through the second radio signal receiving unit 120 (for example, from the baseband signal processor 140 connected with the second radio signal receiving unit 120).

The first carrier frequency generator 131 uses the difference between the carrier frequency specified in the mobile communication system or the GPS signal and the carrier frequency according to the communication type of the short-range wireless communication system to create a first carrier frequency.

For example, the first carrier frequency generator may be configured to switch the second carrier frequency to a lower intermediate frequency and create a first carrier frequency from the intermediate frequency. Alternatively, the first carrier frequency generator may be configured to create a first carrier frequency by inputting the second carrier frequency signal (clock signal) for which synchronization is completed into a clock generator, for example, a PLL, and then inputting a control signal (for example, through power control) for synchronizing the PLL with the first carrier frequency.

A common carrier frequency may be created for synchronization with the connecting device 200 by means of the aforementioned first carrier frequency generator 131. Furthermore, the first carrier frequency generator 131 may create the first carrier frequency in further consideration of specified frequency offsets.

The frequency comparator 133 compares the radio signal preamble used to synchronize the radio signal received from the first radio signal sending/receiving unit 110 and the carrier frequency created in the first carrier frequency generator 131 to decide whether it is within an established or specified frequency offset range.

If the result of comparison indicates it is within the specified frequency offset range, the frequency comparator 133 may determine it is a radio signal to be processed or received in the portable terminal 100, and thus send an analog signal of the radio signal to the baseband signal processor 140. Or, the frequency comparator 133 may unconditionally send the analog signal and then a signal to the baseband signal processor 140 or the control unit 180 to notify them that it is within the specified frequency offset range.

In this embodiment, although the signature determination unit 130 is described to include the first carrier frequency generator 131 (not shown) and the frequency comparator 133, there may be various specific implementations thereof. Therefore, it is not necessary to limit the present invention to the first carrier frequency generator 131 and the frequency comparator 133.

The baseband signal processor 140 extracts a baseband signal from the analog signal of the received radio signal (from the first radio signal sending/receiving unit 110 or the second radio signal receiving unit 120, which is connected thereto) by using the carrier frequency. The baseband signal processor 140 temporarily stores the extracted baseband signal in the FIFO (First In First Output) in the baseband signal processor 140 as a digital signal and sends it to the control unit 180.

In this process, the baseband signal processor 140 may be synchronized with the carrier frequency if required (in this case, through the second radio signal receiving unit 120) or receive the carrier frequency (through the signature determination unit 130) to extract the aforementioned baseband signal.

The control unit 180 controls each component of the portable terminal 100. The control unit 180 is equipped with an execution unit for executing, for example, programs, and uses the programs driven in the execution unit and stored in the memory unit 150 to control each component. In addition, the control unit 180 may be equipped with a hardware logic specialized for specific applications and use this hardware logic to control other components.

For example, the control unit 180 may establish a connection with the connecting device 200 of the short-range wireless communication system when it identifies that the battery level is below a threshold while it is connected with a mobile communication system, or when there is a user's request for making a connection with the short-range wireless communication system through the input unit 160.

In the process of establishing a connection, it is allowed to establish or determine a signature, for example, a frequency offset used in the first radio signal sending/receiving unit 110 by the connecting device 200 or the control unit 180.

The aforementioned determination of a signature enables the control unit 180 not to carry out unnecessary data processing, and the control unit 180 to process appropriate radio signal data only when the signature is the same. Accordingly, it may avoid the performance of the control unit 180 to be lowered, and reduce power consumption in the control unit 180 or the baseband signal processor 140.

Using a signature as described above may filter out radio signals not going to the portable terminal 100 by the control unit 180, to reduce power unnecessarily consumed.

In the embodiment, the control unit 180 may be embedded in a chipset. If embedded in a chipset, other components, for example, the baseband signal processor 140 or the signature determination unit 130, may be embedded in the same chipset, or configured in a different chipset.

The system bus/control bus includes a parallel bus, a serial bus and/or an interrupt line for sending/receiving data or control signals between the control unit 180 and other components.

Through the system bus/control bus, the control unit 180 may send data to each component, receive data from each component, and carry out subsequent processing because it may be aware of receiving specific data.

Figure 5:
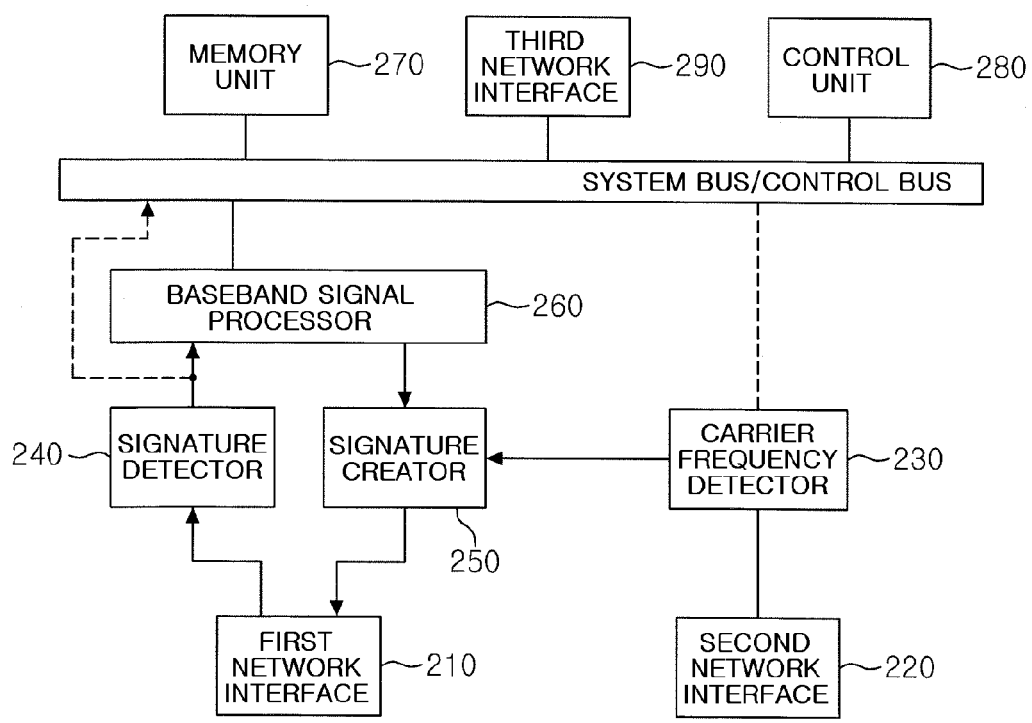
FIG. 5 shows a block diagram of an exemplary connecting device.

FIG. 5 shows a block diagram of an exemplary connecting device 200.

In FIG. 5, the connecting device 200 includes a first network interface 210, a second network interface 220, a third network interface 290, a carrier frequency detector 230, a signature detector 240, a signature creator 250, a baseband signal processor 260, a memory unit 270, a control unit 280, and a system bus/control bus (number not shown).

Some of the components may be omitted depending on the application type of the connecting device 200 if required, and components not shown in FIG. 5 may be further included in the exemplary block diagram of FIG. 5.

Describing each component of the connecting device 200, the first network interface 210 receives and sends a first radio signal through the first network 300 which is short-range wireless communication. The first network interface 210 includes an antenna compliant with to the specific communication protocol of the first network 300.

The first network 300 may be a wireless network enabling short-range communication, for example, Bluetooth, Zig-Bee, a wireless LAN or UWB. The first network 300 includes an antenna for sending/receiving radio packets at a frequency according to each network type.

The second network interface 220 includes an antenna for receiving a second radio signal by using communication protocols different from the first network 300 which is short-range wireless communication. The second radio signal may be, for example, radio signals from a base station which is part of a mobile communication system or GPS radio signals from GPS satellites.

The second network interface 220 receives the second radio signal and may also send radio signals through the antenna if required (for example, if a mobile communication system is used).

The third network interface 290 that may be omitted depending on the type of connecting device 200 enables data received through the first network interface 210 to be sent or the data received through the third network interface 290 to be sent through the first network interface 210 under the control of the control unit 280.

The third network interface 290 may be, for example, an interface for sending/receiving data to/from the Internet through a wired LAN (see second network 400 in FIG. 3).

The carrier frequency detector 230 detects carrier signals included in the analog signal of the radio signals received through the second network interface 220 from the analog signal.

For example, the carrier frequency detector 230 includes a PLL (Phase Locked Loop) for frequency synchronization and detects a carrier signal of a mobile communication system or GPS signals. It is not essential that the carrier frequency detected by the carrier frequency detector 230 is the same as the carrier frequency of the portable terminal 100 to be connected.

The signature detector 240 detects a signature of any radio packets sent/received by wireless according to the specified communication protocol of the short-range wireless communication system.

The signature detector 240 detects a preamble from an analog signal received through the first network interface 210, measures or detects offsets of the preamble from the specified carrier frequency through the first network interface 210.

The detected frequency offsets may be delivered to the control unit 280 directly or through the baseband signal processor 260. The frequency offsets delivered as such may be used in establishing a signature with the portable terminal 100 by means of the control unit 280.

The signature detector 240 may receive the first carrier frequency from the signature creator 250 or directly create the first carrier frequency used in the first network interface 210, to compare it with the received frequency of preamble and then determine a frequency difference between them.

The signature creator 250 creates a signature to identify a receiving device or a terminal in the physical layer and loads this signature onto the first carrier frequency to output it into the first network interface 210 under the control of the control unit 280. The signature creator 250 may include one or more first carrier frequency generators 251 (number not shown specifically).

If it includes only one first carrier frequency generator 251, the first carrier frequency generator 251 creates a specified frequency (for example, 2.4 GHz, 900 MHz) according to the specified communication type of the short-range wireless communication system from the second carrier frequency received from the carrier frequency detector 230. Then the first carrier frequency generator 251 adds the specified frequency offset to this created frequency to reflect the frequency offset on the first carrier frequency.

To this end, the first carrier frequency generator 251 creates the first carrier frequency by using the difference between the carrier frequency specified in a mobile communication system or the GPS signal and the carrier frequency according to the communication type of the short-range wireless communication system. Also, the first carrier frequency generator 251 may create the first carrier frequency by further adding a specific frequency offset under the control of the control unit 280.

If a plurality of first carrier frequency generators 251 are included in the signature creator, each first carrier frequency generator 251 may create a first carrier frequency by adding each different frequency offset.

As described above, the connecting device 200 and the portable terminal 100 use the same radio signal to create one reference carrier frequency. Therefore, accurate carrier frequency synchronization may be implemented between the connecting device 200 and the portable terminal 100.

In general, since a mobile communication system requires frequency accuracy of a carrier frequency not greater than 0.1 ppm, the carrier frequency synchronized in the first carrier frequency generator 251 contributes to implementing accurate synchronization.

The baseband signal processor 260 extracts the baseband signal from the analog signal received from the signature detector 240 using a carrier frequency (created in the signature detector 240 or the signature creator 250). The baseband signal processor 260 converts the extracted baseband signal to a digital signal to store it in the FIFO and then delivers it to the control unit 280.

In addition, the baseband signal processor 260 may convert the data received from the control unit 280 to a baseband signal, and deliver it to the signature creator 250 under the control of the control unit 280.

The memory unit 270 includes a volatile memory and/or a nonvolatile memory. The memory unit 270 may store application programs used in the connecting device 200, or store temporary data required by the application programs.

The control unit 280 controls each component of the connecting device 200. The control unit 280 is equipped with, for example, an execution unit for executing programs to control each component by using the programs driven in the execution unit and stored in the memory unit 270. In addition, the control unit 280 is further equipped with a hardware logic specialized for a specific application, and uses it to control other components.

For example, the control unit 280 may receive a request for making a connection with the second network 400 (through the third network interface 290 or the second network interface 220) through the first network 300 which is a short-range wireless communication network.

In response to the request for making a connection, the control unit 280 determines a signature to be used in the physical layer. The signature may be a frequency offset from the first carrier frequency used in a specified communication protocol of the first network 300.

To this end, the control unit 280 cyclically collects frequency offsets detected through the signature detector 240. These frequency offsets may be those detected from radio signals of external portable terminals 100 connected through the connecting device 200 or devices using the same frequency as a carrier frequency although they are not connected with the connecting device 200.

In general, a wireless LAN or Bluetooth uses the frequencies of 2.4 GHz, 2.45 GHz, or 5 GHz as a carrier frequency. It allows a given frequency offset range in the carrier frequency.

For example, a wireless LAN (short-range wireless communication network) allows frequency offsets not smaller than 20 ppm in consideration of frequency offsets in each device. On the contrary, in a mobile communication system, frequency offsets not greater than 0.1 ppm are allowed, and, in addition, it is possible for the GPS to have frequency offsets smaller than that. Therefore, it is allowed to establish more than tens of frequency offset ranges (for example, allowable frequency offset range between +500 Hz and −500 Hz both inclusive) within an allowable range (for example, allowable frequency offset range between +48 KHz and −48 KHz both inclusive) of frequency offsets of a wireless LAN.

The control unit 280 may establish the frequency offsets as frequency offsets for the respective portable terminals 100 that request a connection. In this case, it allocates the frequency offsets to portable terminals 100 that request a connection using the frequency offsets collected through the signature detector 240 and then delivers the allocated frequency offsets to the portable terminals 100.

As described above, the portable terminal 100 and the connecting device 200 create a carrier frequency used for the first network 300 by using the same as or an even more accurate carrier frequency. Therefore, when the data are outputted as radio signals by adding the frequency offset allocated by the control unit 280 to the carrier frequency, the portable terminal 100 that receives the radio signals may identify whether the frequency offset is the frequency offset allocated to or establish for itself in the physical layer (for example, in a preamble).

In addition, the control unit 280 may use the memory unit 270 to store frequency offset information for connected one or more portable terminals 100. The control unit 280 may further use the stored frequency offset information to establish a frequency offset of a specific portable terminal 100 that requests a connection.

For example, if four portable terminals 100 are connected with the connecting device 200 in this manner, a frequency offset of −36 KHz may be allocated to one portable terminal 100; a frequency offset of −12 KHz to another portable terminal 100; a frequency offset of +12 KHz to the other portable terminal 100; and a frequency offset of +36 KHz to the last portable terminal 100.

The control unit 280 may further add the frequency offset allocated to its corresponding portable terminal 100 to the carrier frequency (for example, to create '2.4 GHz-36 KHz', '2.4 GHz-12 KHz', '2.4 GHz+12 KHz', or '2.4 GHz+36 KHz' as a carrier frequency) and then output data packets through the first network interface 210 by wireless.

There may be different devices using the same frequency although not connected with the connecting device 200. Since the connecting device 200 detects frequency offsets through the signature detector 240, the portable terminal 100 is less likely to process the data packet although the data packet does not specify a connected portable terminal 100 as a destination address. Although processing the data packet occurs, it is more efficient filtering of radio signal packets than conventional methods, results in reducing power consumption.

The system bus/control bus includes a parallel bus, a serial bus and/or an interrupt line for sending/receiving data or control signals between the control unit 280 of the connecting device 200 and other components.

Through the system bus/control bus, the control unit 280 may send data to each component, receive data from each component, and carry out subsequent processing because it may be aware of receiving specific data.

Figure 6:
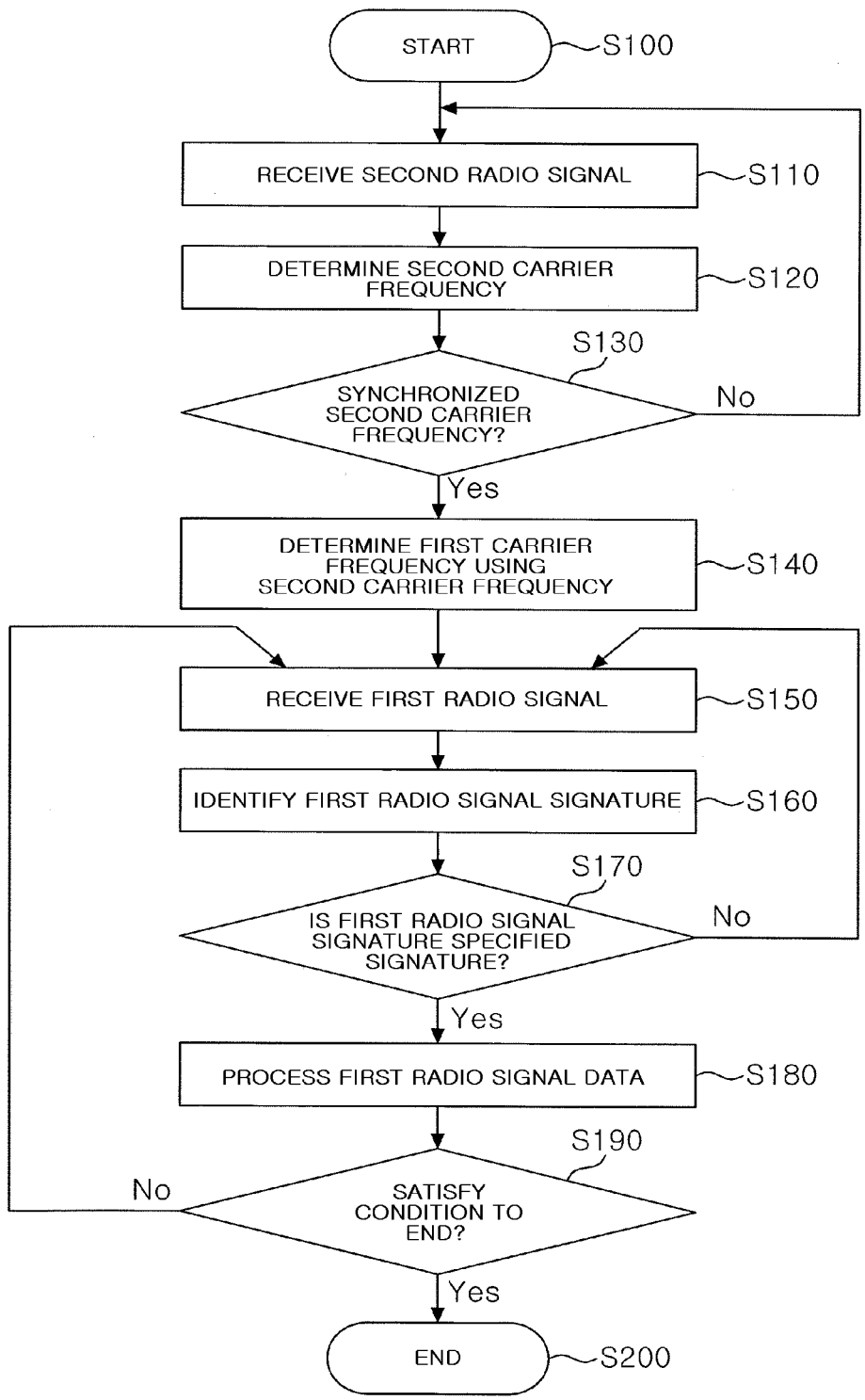
FIG. 6 shows a control flow of a method for receiving radio packets through short-range wireless communication carried out in a portable terminal in accordance with the present invention.

FIG. 6 shows a control flow of a method for receiving radio packets through short-range wireless communication carried out in the portable terminal 100 in accordance with the present invention. The control flow may be carried out by using the block diagram of FIG. 4.

As the portable terminal 100 is described herein above in detail, it is briefly described now.

The control flow starts automatically after booting or starts in response to a portable terminal 100 user's request for making a connection with a short-range wireless communication system at operation S100.

At operation S110, the portable terminal 100 receives a radio signal, which is different from the communication protocol used in the short-range wireless communication system, as a second radio signal from, for example, a mobile communication system, or GPS satellites.

At operation S120, a second carrier frequency which is a carrier frequency used in a mobile communication system or GPS satellites is determined from the second radio signal.

At operation S130, it is determined whether the second carrier frequency implements frequency synchronization. If synchronization is not implemented yet, the control flow goes to operation S110 to attempt synchronization of the second carrier frequency repeatedly.

The aforementioned process of synchronizing the second carrier frequency may repeat at different times or different locations. For example, the process may be carried out again if the portable terminal 100 is not frequency-synchronized (for example, it is travelling or the like).

At operation S140, a first carrier frequency which is a carrier frequency used in short-range wireless communication is determined using the second carrier frequency. The first carrier frequency may be a reference carrier frequency used in short-range wireless communication or a frequency to which a frequency offset from the reference carrier frequency is added.

At operation S150, the first radio signal carried and sent on the first carrier frequency through short-range wireless communication is received.

At operation S160, the portable terminal 100 identifies a signature to determine subsequent processing for the first radio signal in the analog signal thereof. The portable terminal 100 determines whether the identified signature is a signature specified in the process of connection with the connecting device 200.

For example, operation S160 is for identifying a preamble used for signal synchronization of short-range wireless communication at an analog signal of the first radio signal, and determining whether the frequency of the identified preamble is within the offset range for the specified frequency offset.

For example, if a specified frequency offset is 12 KHz, and a reference carrier frequency used in short-range wireless communication is 2.4 GHz, it is determined whether the frequency from the identified preamble is within the +/- offset range (for example, the offset range may be established as 500 Hz or 1 KHz) centering around 2.4 GHz+12 KHz. If it is within the offset range, the signature in the physical layer is or may be determined to be the same as the specified signature.

Subsequently at operation S170, if the identified signature of the first radio signal and the specified signature is same, the control flow advances to operation S180. Otherwise, the control flow returns to operation S150 not to carry out subsequent processing of the first radio signal currently received.

At operation S180, the portable terminal 100 extracts data (for example, data in the payload) from the first radio signal and the control unit 180 processes the extracted data.

At operation S190, if the condition for ending the control flow is satisfied, the control flow goes to operation S200 to end, and otherwise to returns S150 to repeat the process of further receiving other radio signals.

In this case, exemplary conditions for ending the process include, for example, the battery of the portable terminal 100 does not supply power thereto, the user wants to end the process, and the request for ending the process by the connecting device 200.

The aforementioned control flow avoids radio data packets to be unnecessarily processed. Therefore, consumed power is reduced while using a short-range wireless communication system.

While the description of the present invention has been made to the exemplary embodiments, various changes and modifications may be made without departing from the scope of the invention. The embodiments of the present invention are not limited thereto. Therefore, the scope of the present invention should be defined by the appended claims rather than by the foregoing embodiments.

The invention claimed is:

1. A method for reducing a power consumption of a mobile terminal for cellular network using radio packets through short-range wireless communication, the method comprising:
   receiving a first radio signal through the short-range wireless communication network including WLAN (wireless local area network);
   identifying a preamble of the first radio signal and determining whether the preamble being used to synchronize the mobile terminal with the short-range wireless communication;
   determining whether a frequency from the identified preamble is within a specified frequency offset range allocated to the mobile terminal in a total frequency offset range allowable for the short-range wireless communication network; and
   processing data from the received first radio signal in response to determination of the frequency from the identified preamble being within the specified frequency offset range.

2. The method of claim 1, further comprising, before said receiving a first radio signal:
   receiving a second radio signal from a cellular network including CDMA (Code Division Multiple Access) or GSM (Global System for Mobile Communications);
   determining a frequency of the second radio signal; and
   determining a frequency of the first radio signal using the determined frequency of the second radio signal, wherein said determining whether the frequency from the identified preamble is within the specified frequency offset range further comprises;

determining whether the frequency from the identified preamble is within the specified frequency offset range using the frequency of the first radio signal.

3. The method of claim 1, wherein identifying the preamble of the first radio signal is performed using a physical layer of 7 layers of the OSI (Open Systems Interconnection) model.

4. A portable terminal comprising:
one or more units being configured and executed by a processor using algorithm associated with least one non-transitory storage device, the one or more units comprising:
a first radio signal sending/receiving unit configured to send/receive first radio signal through short-range wireless communication network including WLAN (wireless local area network);
a second radio signal receiving unit configured to receive a second radio signal from a cellular network including CDMA (Code Division Multiple Access) or GSM (Global System for Mobile Communications);
a signature determination unit configured to identify a preamble of the first radio signal, to determine whether the preamble used to synchronize the portable terminal with the short-range wireless communication network, and
to determine whether a frequency from the identified preamble is within a specified frequency offset range allocated to the portable terminal in a total frequency offset range allowable for the short-range wireless communication network; and
in response to determination of the frequency from the identified preamble being within the specified frequency offset range, the processor of a control unit configured to process the data from the received first radio signal.

5. A short-range wireless communication system, the system comprising:
a connecting device including, a signature detector/creator, a non-transitory memory and a processor, the connecting device being connected with a first network interface and a second network interface, the connecting device being communicated with one or more portable terminals via a network;
the first network interface configured to receive a first radio signal through the short-range wireless communication network including WLAN (wireless local area network);
the second network interface configured to receive a second radio signal through cellular network including CDMA (Code Division Multiple Access) or GSM (Global System for Mobile Communications); and
the signature detector/creator configured and controlled by the processor using algorithm to identify a preamble of the first radio signal and to determine whether the preamble used to synchronize the short-range wireless communication, wherein determine whether the preamble used to synchronize the short-range wireless communication further comprises
to determine, by the processor, a frequency of the second radio signal,
to determine a frequency of the first radio signal using the determined frequency of the second radio signal,
to establish a signature using a frequency offset for the first radio signal, the signature being different for each of the one or more portable terminals for radio data communication through the first network interface with the one or more portable terminals, and
to determine whether to process radio signal data in each of the one or more portable terminals, wherein the signature is identified in a physical layer of 7 layers of the OSI (Open Systems Interconnection) model.

6. The system of claim 5, wherein the connecting device is configured to determine establishing a connection with the one or more portable terminals.

* * * * *